Aug. 11, 1931.   R. J. LAILLÉ   1,818,407
PROGRESSIVE CHANGE SPEED AND REVERSING DEVICE
Filed Dec. 20, 1929
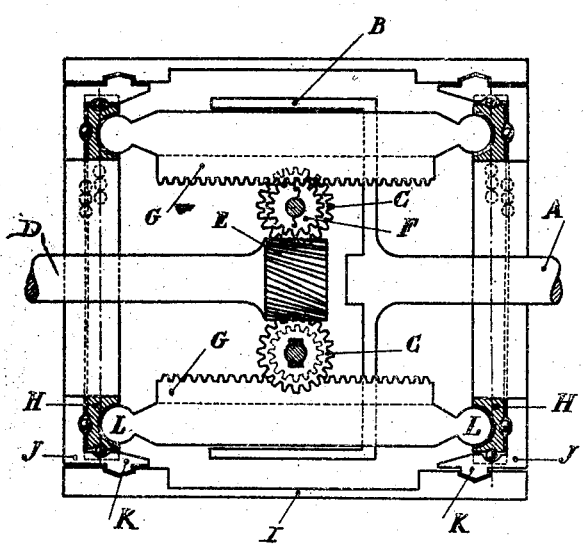
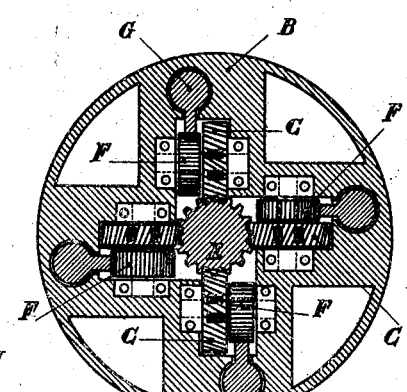
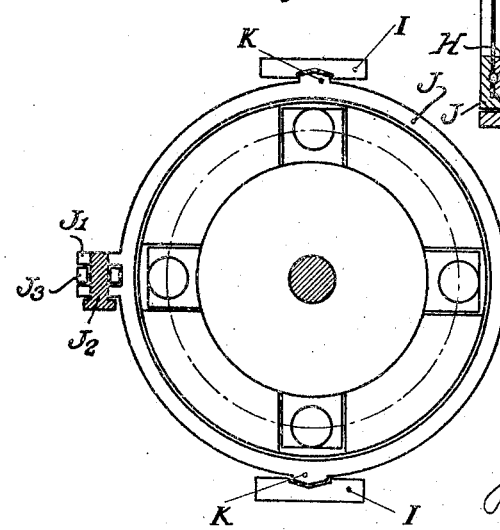
Applicant:
Rene Jean Laillé,
By Mauro & Lewis
Attorneys.

Patented Aug. 11, 1931

1,818,407

UNITED STATES PATENT OFFICE

RENÉ JEAN LAILLÉ, OF LA ROCHELLE, FRANCE

PROGRESSIVE CHANGE-SPEED AND REVERSING DEVICE

Application filed December 20, 1929, Serial No. 415,501, and in France December 22, 1928.

The present invention relates to a change-speed device in which the driving shaft imparts its motion to the actuated shaft in an absolutely progressive manner, by means of planetary pinions which also provide for the reversing operation.

In the accompanying drawings:—

Figure 1 is a diagrammatic longitudinal view of the device.

Figure 2 is a cross section of the same.

Figure 3 is an end view.

Fig. 4 shows a modification.

The said change-speed device comprises a driving shaft A upon which are disposed, in a frame B, connected with said shaft, a certain number of planetary pinions C and perpendicular to the same, comprising two, three or four pinions as desired, these being of the spiral type.

The said planetary pinions are equally spaced apart, and are situated at the same distance from the center of the said driving shaft, thus obtaining a well-balanced device.

The said pinions are in constant engagement with the actuated or driven shaft D by means of the spiral wheel E which is mounted on the end of said shaft. On the left of each planetary pinion is mounted a spur gear wheel F controlled by a rack G which also serves as a slide.

Two ball bearings H, provided with thrust ball bearings, are rotatable on two respective disks J which are mounted on the stationary frame I, and are adapted to pivot about a vertical axis whose pivots are shown at K, and hence the said disks may be turned into any position. The said ball bearings are thus mounted at each end of the said racks and rotate with the latter, and also with the whole system of the driving shaft.

As shown in Fig. 3, the disks J are provided with lateral projection $J_1$ wherein is pivoted, by means of a pin $J_2$, a link $J_3$ for connecting both disks together and to any suitable control device. It is only necessary to operate one disk by means of the control device (not shown) for driving both disks simultaneously.

The operation is as follows:—

With the driving shaft rotating in the clockwise direction, the planetary pinions will be moved together with said shaft, but parallel to their axes. They can be rotated on their axes, at the driver's will each by the auxiliary gear wheel F which is driven by the rack G.

Each rack follows the movement of rotation of the driving shaft, and it is thus in constant engagement with its pinion, so that during the first half of a revolution, the pinion will be moved through a distance determined by the amount through which the said disks have been turned. During the second half of the revolution, the rack returns to the rear, but without any gear release, and the pinion is made free by means of any well known free-wheel device (not shown), and can thus resume its thrust action.

The said racks are rotatable between the ball-bearings H and make contact with these by means of the ball-and-socket joints L. Thus the two ball bearings will also follow the rotation of the driving element, being actuated by the ball joints of the racks, and these racks, according to the degree of inclination of the disks, will give to their female parts an elliptical stroke, which is allowed by a small flat guide disposed in the ball bearing, upon its inner face and parallel to its radius.

For the dead center, with the driving shaft rotating in the aforesaid direction and the disks turned through a certain angle, the planetary pinions, which are indirectly driven by the guides, will rotate the actuated shaft contrary to the driving shaft; if the speed of this motion is equal to the speed of the driving shaft, there will be an equilibrium of speeds, and the actuated shaft will remain motionless, thus representing the dead center.

For the forward motion and the direct drive, if the motion imparted by the planetary pinions has a speed of rotation below that of the driving shaft, the device will be unbalanced to the advantage of the driving shaft, and this shaft will tend to draw the other shaft with it in its rotation, but its action will be partly reduced by that of the planetary pinions which tend to reverse its motion, and this provides for forward motion at reduced speed.

When the disks are exactly perpendicular to the device consisting of the driving and the actuated shaft, this affords the direct drive, and herein none of the elements are in operation. The said racks, which have no movement to make, will no longer act. At this time, the whole apparatus is held fast, and the actuated shaft is connected to the driving shaft and turns at the same speed and in the same direction as the latter.

For the back motion, if the planetary pinions, under the action of the said racks, rotate on their axes at a rate exceeding that of the driving shaft, the speeds will be unbalanced, to the advantage of the actuated shaft, which will not however remain motionless, but will turn in a direction contrary to the rotation of the driving shaft. This affords the back drive, and the speed is determined, as for the forward motion, by increasing or diminishing the angular position of the disks.

The said device is advantageous due to the fact that it requires no clutch coupling or release, and that will make use of the whole range of speeds for the forward or back drive.

The device can be employed for all powers and with all machines requiring different speeds. It is lubricated by the splashing method.

In the modification shown in Fig. 4, the rack G is replaced by a worm 1 with right and left hand thread, and having one or more threads, this being held upon its axis by a member slidable in a straight groove in the main frame B. At the ends of said worm are the ball-and-socket joints L, and this device operates in exactly the same manner as the rack G. The pinion E of the actuated shaft is of the spur gear type, as also the planetary pinions C which are parallel to said shaft, and upon the latter, and are in constant engagement therewith. Each worm 1 imparts a constant rotation, irrespectively of its direction of movement, to the corresponding planetary pinion, which it traverses at its center, by means of two rings 2 and 3 in internal engagement therewith by a screwthread, one upon its right hand thread, and the other upon its left hand thread.

The said rings, which are loose upon the axis of the auxiliary pinion, are provided with clutch teeth 4 at their external end and upon the whole periphery at their end portion, which may engage, according to the direction of motion of the said worm, with like teeth formed upon the auxiliary pinion.

The advantage of this modification consists in the fact that it employs both directions of the stroke and it simplifies the apparatus and appreciably reduces the number of pinions in use.

Obviously, the forms, details and dimensions of the apparatus according to the said invention may be varied without prejudice to its principle, and this principle is the same in the four applications herein described.

What I claim is:—

1. In an apparatus of the type described, having a stationary casing, a driving shaft, an actuated shaft, a frame connected to said driving shaft and rotatable therewith and a plurality of means slidably mounted in the said frame, the combination of rotatably adjustable controlling means pivotally mounted on said stationary casing about an axis at right angles to said shaft, means adapted to freely rotate with respect to said controlling means and operatively engaging said slidable means for slidably reciprocating in a continuous manner the slidable means in the said frame, a plurality of pinions operatively connected to and actuated in rotation by the said slidable means, and means for imparting to the said actuated shaft the movement of rotation of said pinions.

2. In an apparatus of the type described, having a driving shaft, an actuated shaft, a frame connected to said driving shaft and rotatable therewith, and a plurality of means slidably mounted in the said frame, the combination of adjustable disks engaging said slidable means for slidably reciprocating in continuous manner said slidable means in the said frame, a rotatable ball bearing on each of said disks, a ball and socket joint between said slidable means and each of said ball bearings, a plurality of pinions operatively connected to and actuated in rotation by the said slidable means, and means for imparting to the said actuated shaft the movement of rotation of said pinions.

3. In an apparatus of the type described, having a driving shaft, an actuated shaft, and a frame connected to said driving shaft and rotatable therewith, the combination of a plurality of worms slidably mounted in the said frame, rotatably adjustable means for slidably reciprocating in continuous manner, said worms in the said frame, a plurality of pinions operatively connected to and actuated in rotation by said slidable worms, and means for imparting to the said actuated shaft the movement of rotation of said pinions.

4. In an apparatus of the type described, having a driving shaft, an actuated shaft and a frame connected to said driving shaft and rotatable therewith, the combination of a plurality of worms slidably mounted in the said frame, adjustable disks engaging said worms for slidably reciprocating in continuous manner said worms in the said frame, a rotatable ball bearing on each of said disks, a ball and socket joint between said slidable means and each of said ball bearings, a plurality of pinions operatively connected to and actuated in rotation by the said slidable worms, and means for imparting to the said actuated shaft the movement of rotation of said pinions.

5. In an apparatus of the type described, having a driving shaft, an actuated shaft, and a frame connected to said driving shaft and rotatable therewith, the combination of a plurality of worms with right and left handed thread, slidably mounted in the said frame, rotatably adjustable means for slidably reciprocating in continuous manner said worms in the said frame, a plurality of pinions operatively connected to and actuated in rotation by said slidable worms, and means for imparting to the said actuated shaft the movement of rotation of said pinions.

6. In an apparatus of the type described, having a driving shaft, an actuated shaft, and a frame connected to said driving shaft and rotatable therewith, the combination of a plurality of worms with right and left handed threads slidably mounted in the said frame, rotatably adjustable means for slidably reciprocating in continuous manner said worms in the said frame, means actuated in rotation by said slidable worms, a plurality of pinions, means for imparting to said pinions the movement of rotation of said means actuated by the worms, and other means for finally imparting to the said actuated shaft the movement of rotation of said pinions.

7. In an apparatus of the type described, having a driving shaft, an actuated shaft, and a frame connected to said driving shaft and rotatable therewith, the combination of a plurality of worms, with right and left handed threads slidably mounted in the said frame, rotatably adjustable means for slidably reciprocating in continuous manner said worms in the said frame, rings in internal engagement with each of said worms by a screw thread, one upon its right-hand thread and the other upon its left-hand thread, a plurality of pinions, clutch teeth between said pinion and said rings for imparting to said pinions the movement of rotation of said rings, and means for imparting to said actuated shaft the movement of rotation of said pinions.

In testimony whereof I have signed this specification.

RENÉ JEAN LAILLÉ.